US010907256B2

(12) United States Patent
Roberge et al.

(10) Patent No.: US 10,907,256 B2
(45) Date of Patent: Feb. 2, 2021

(54) REINFORCEMENT OF A DEPOSITED STRUCTURE FORMING A METAL MATRIX COMPOSITE

(71) Applicant: UNITED TECHNOLOGIES CORPORATION, Farmington, CT (US)

(72) Inventors: Gary D. Roberge, Tolland, CT (US); William J. Brindley, Hebron, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 367 days.

(21) Appl. No.: 15/388,392

(22) Filed: Dec. 22, 2016

(65) Prior Publication Data

US 2018/0179640 A1 Jun. 28, 2018

(51) Int. Cl.
C23C 24/04 (2006.01)
F01D 25/00 (2006.01)
B33Y 10/00 (2015.01)
C23C 4/18 (2006.01)
C23C 4/08 (2016.01)
(Continued)

(52) U.S. Cl.
CPC .............. *C23C 24/04* (2013.01); *B22F 5/003* (2013.01); *C22C 47/068* (2013.01); *C23C 4/02* (2013.01); *C23C 4/06* (2013.01); *C23C 4/08* (2013.01); *C23C 4/134* (2016.01); *C23C 4/185* (2013.01); *F01D 25/005* (2013.01); *B22F 3/008* (2013.01); *B22F 3/1055* (2013.01); *B33Y 10/00* (2014.12); *F05D 2220/32* (2013.01); *F05D 2230/31* (2013.01); *F05D 2300/6032* (2013.01); *Y02P 10/25* (2015.11)

(58) Field of Classification Search
None
See application file for complete search history.

(56) References Cited

U.S. PATENT DOCUMENTS 5,626,462 A 5/1997 Jackson
6,308,765 B1 10/2001 Grinberg
(Continued)

FOREIGN PATENT DOCUMENTS

DE 102004035773 1/2006
DE 102009037894 2/2011
(Continued)

OTHER PUBLICATIONS

European Patent Office, European Office Action dated Feb. 13, 2019 in Application No. 17204167.5.
(Continued)

*Primary Examiner* — Colleen P Dunn
*Assistant Examiner* — Anthony M Liang
(74) *Attorney, Agent, or Firm* — Snell & Wilmer LLP

(57) ABSTRACT

A method for forming a reinforced metallic structure includes providing a tool having a formation surface corresponding to a desired structure shape of the reinforced metallic structure. The method also includes positioning a plurality of fibers on the formation surface of the tool. The method also includes depositing a layer of material on the plurality of fibers using a cold-spray technique. The method also includes removing the layer of material with the plurality of fibers from the tool to create the reinforced metallic structure.

10 Claims, 10 Drawing Sheets

(51) Int. Cl.

| | | |
|---|---|---|
| *C23C 4/02* | (2006.01) | |
| *C23C 4/06* | (2016.01) | |
| *C23C 4/134* | (2016.01) | |
| *B22F 5/00* | (2006.01) | |
| *C22C 47/06* | (2006.01) | |
| *B22F 3/00* | (2021.01) | |
| *B22F 3/105* | (2006.01) | |

(56) References Cited

U.S. PATENT DOCUMENTS

| | | | |
|---|---|---|---|
| 6,527,038 | B1 | 3/2003 | Jordan |
| 2003/0000675 | A1 | 1/2003 | Fried |
| 2004/0202886 | A1 | 10/2004 | Subramanian |
| 2004/0219383 | A1 | 11/2004 | Roche et al. |
| 2006/0108031 | A1 | 5/2006 | Haynes |
| 2006/0166020 | A1 | 7/2006 | Raybould |
| 2009/0120539 | A1 | 5/2009 | Ko |
| 2010/0051718 | A1 | 3/2010 | Vanderzwet |
| 2010/0172789 | A1 | 7/2010 | Calla |
| 2011/0305892 | A1 | 12/2011 | Schlichting |
| 2012/0077017 | A1 | 3/2012 | Buresch |
| 2012/0114868 | A1 | 5/2012 | Bunker |
| 2012/0171041 | A1 | 7/2012 | Jakimov |
| 2013/0180432 | A1 | 7/2013 | Calla |
| 2014/0277669 | A1 | 9/2014 | Nardi |
| 2014/0356219 | A1 | 12/2014 | Gammel |
| 2015/0147479 | A1 | 5/2015 | Bunker |
| 2015/0165697 | A1 | 6/2015 | Gulizia et al. |
| 2017/0173611 | A1 | 6/2017 | Tan |
| 2018/0056395 | A1 | 3/2018 | Hofacker |
| 2018/0119300 | A1* | 5/2018 | Yang .................. B29C 33/3842 |
| 2018/0162060 | A1 | 6/2018 | Mark |

FOREIGN PATENT DOCUMENTS

| | | |
|---|---|---|
| DE | 102014206073 | 10/2015 |
| EP | 0911426 | 4/1999 |
| EP | 1942209 | 7/2008 |
| EP | 2261397 | 12/2010 |
| EP | 2806711 | 11/2014 |
| EP | 2881489 | 6/2015 |
| WO | 2008056345 | 5/2008 |
| WO | 2011042090 | 4/2011 |
| WO | 2014096822 | 6/2014 |
| WO | 2014116256 | 7/2014 |
| WO | 2016064460 | 4/2016 |

OTHER PUBLICATIONS

Invitation Pursuant to Rule 63(1) EPC dated Mar. 14, 2018 in European Application No. 17199941.0.
European Patent Office, European Office Action dated Feb. 14, 2019 in Application No. 17204011.5.
USPTO, Non-Final Office Action dated Feb. 14, 2019 in U.S. Appl. No. 15/388,567.
European Patent Office, European Office Action dated Feb. 26, 2019 in Application No. 17199941.0.
USPTO, Restriction/Election Requirement dated Feb. 27, 2019 in U.S. Appl. No. 15/388,223.
USPTO, Restriction/Election Requirement dated Mar. 11, 2019 in U.S. Appl. No. 15/388,286.
USPTO, Non-Final Office Action dated Mar. 13, 2019 in U.S. Appl. No. 15/388,172.
Gibson I., Rosen D., Stucker B. (2010), "Additive Manufacturing Technologies", Springer, Boston, MA, p. 407-412, Year: 2010.
USPTO, Restriction/Election Requirement dated Apr. 9, 2019 in U.S. Appl. No. 15/388,649.
USPTO, Restriction/Election Requirement dated Jan. 18, 2019 in U.S. Appl. No. 15/388,485.
USPTO, Restriction/Election Requirement dated Jan. 9, 2019 in U.S. Appl. No. 15/388,567.
USPTO, Restriction/Election Requirement dated Jan. 30, 2019 in U.S. Appl. No. 15/388,172.
European Patent Office, European Search Report dated Mar. 13, 2018 in Application No. 17199958.4-1103.
European Patent Office, European Search Report dated Mar. 26, 2018 in Application No. 17204011.5-1108.
T. Hussain et al: "Corrosion Behavior of Cold Sprayed Titanium Coatings and Free Standing Deposits", Journal of Thermal Spray Technology., vol. 20, No. 1-2, Aug. 11, 2010 (Aug. 11, 2010), pp. 260-274.
European Patent Office, European Search Report dated Apr. 20, 2018 in Application No. 17204011.5-1108.
European Patent Office, European Search Report dated Apr. 24, 2018 in Application No. 17204167.5-1108.
European Patent Office, European Search Report dated May 9, 2018 in Application No. 17209711.5-1108.
European Patent Office, European Search Report dated May 22, 2018 in Application No. 17199605.1-1103.
European Patent Office, European Search Report dated May 29, 2018 in Application No. 17199941.0-1103.
Pattison et al: "Cold gas dynamic manufacturing: A non-thermal approach to freeform fabrication", International Journal of Machine Tool Design and Resea, Pergamon Press, Oxford, GB, vol. 47, No. 3-4, Dec. 15, 2006 (Dec. 15, 2006), pp. 627-634.
U.S. Appl. No. 15/388,172, filed Dec. 22, 2016 and entitled Deposited Material Structure With Integrated Component.
U.S. Appl. No. 15/388,223, filed Dec. 22, 2016 and entitled Material Deposition to Form a Sheet Structure.
U.S. Appl. No. 15/388,286, filed Dec. 22, 2016 and entitled Modular Tooling for a Deposited Structure.
U.S. Appl. No. 15/388,485, filed Dec. 22, 2016 and entitled Deposited Structure With Integral Cooling Enhancement Features.
U.S. Appl. No. 15/388,649, filed Dec. 22, 2016 and entitled Multi-Wall Deposited Thin Sheet Structure.
U.S. Appl. No. 15/388,567, filed Dec. 22, 2016 and entitled Reinforcement of a Deposited Metallic Structure Using Reinforcing Particles.
USPTO, Advisory Action dated Aug. 5, 2019 in U.S. Appl. No. 15/388,172.
USPTO, Notice of Allowance dated Sep. 19, 2019 in U.S. Appl. No. 15/388,223.
USPTO, Final Office Action dated Sep. 20, 2019 in U.S. Appl. No. 15/388,286.
Chua, Chee Kai, and Kah Fai Leong. 3D Printing and Additive Manufacturing: Principles and Applications. World Scientific, 2014. (Year: 2014).
European Patent Office, European Search Report dated Sep. 26, 2019 in Application No. 17199958.4.
USPTO, Final Office Action dated May 10, 2019 in U.S. Appl. No. 15/388,567.
USPTO, Non-Final Office Action dated May 21, 2019 in U.S. Appl. No. 15/388,223.
USPTO, Non-Final Office Action dated May 21, 2019 in U.S. Appl. No. 15/388,286.
USPTO, Final Office Action dated May 24, 2019 in U.S. Appl. No. 15/388,172.
USPTO, Notice of Allowance dated May 28, 2019 in U.S. Appl. No. 15/388,485.
USPTO, Advisory Action dated Jun. 11, 2019 in U.S. Appl. No. 15/388,567.
USPTO, Non-Final Office Action dated Apr. 17, 2019 in U.S. Appl. No. 15/388,485.
USPTO, Notice of Allowance dated Jun. 24, 2019 in U.S. Appl. No. 15/388,485.
USPTO, Notice of Allowance dated Oct. 17, 2019 in U.S. Appl. No. 15/388,649.
USPTO, Corrected Notice of Allowance dated Oct. 25, 2019 in U.S. Appl. No. 15/388,223.
U.S. Appl. No. 16/688,824, filed Nov. 19, 2019 and entitled Deposited Material Structure With Integrated Component.
USPTO, Advisory Action dated Nov. 27, 2019 in U.S. Appl. No. 15/388,286.

(56) References Cited

OTHER PUBLICATIONS

USPTO, Corrected Notice of Allowance dated Dec. 26, 2019 in U.S. Appl. No. 15/388,649.
USPTO, Notice of Allowance dated Dec. 27, 2019 in U.S. Appl. No. 15/388,172.
USPTO, Non-Final Office Action dated Jan. 13, 2020 in U.S. Appl. No. 15/388,567.
Kaldas, A. et al. "Laser machining in die making—a modem rapid tooling process." 2004. Journal of materials processing technology. 155-156. p. 1815-1820. (Year: 2004).
USPTO, Final Office Action dated Jun. 23, 2020 in U.S. Appl. No. 15/388,567.
European Patent Office, Office Action dated Jan. 7, 2020 in Application No. 17199605.1.
USPTO, Advisory Action dated Feb. 4, 2020 in U.S. Appl. No. 15/388,392.
USPTO, Corrected Notice of Allowance dated Feb. 5, 2020 in U.S. Appl. No. 15/388,172.

\* cited by examiner

REINFORCEMENT OF A DEPOSITED STRUCTURE FORMING A METAL MATRIX COMPOSITE

FIELD

The present disclosure is directed to a system and a method for creation of a metallic structure having a plurality of fibers for reinforcing the metallic structure.

BACKGROUND

Gas turbine engines include multiple components, a portion of which are formed as sheet structures. These sheet structures are currently hot or cold formed using dies. The dies include a relatively durable material that is capable of withstanding the temperature, pressure, and other loads applied to the die via the selected forming operation. The material used in the dies may be relatively expensive. Furthermore, formation of dies is a relatively time-consuming and expensive process. The time and expense of forming the dies increases as the complexity, such as complex contours and size, of the desired part increases.

SUMMARY

Disclosed herein is a method for forming a reinforced metallic structure. The method includes positioning a plurality of fibers on a formation surface of a tool, the formation surface corresponding to a desired structure shape of the reinforced metallic structure. The method also includes depositing a layer of material on the plurality of fibers using a cold-spray technique. The method also includes removing the layer of material with the plurality of fibers from the tool to create the reinforced metallic structure.

Any of the foregoing embodiments may also include depositing a base layer of material on the formation surface of the tool using the cold-spray technique prior to positioning the plurality of fibers on the formation surface.

In any of the foregoing embodiments, positioning the plurality of fibers on the formation surface of the tool includes orienting each of a first group of the plurality of fibers in a direction parallel to each other prior to depositing the layer of material on the plurality of fibers.

Any of the foregoing embodiments may also include securing at least two fibers of the plurality of fibers together prior to depositing the layer of material on the plurality of fibers such that the at least two fibers of the plurality of fibers resist separation in response to depositing the layer of material on the plurality of fibers.

In any of the foregoing embodiments, positioning the plurality of fibers on the formation surface of the tool further includes orienting each of a second group of the plurality of fibers parallel to each other and perpendicular to the first group of the plurality of fibers prior to depositing the layer of material on the plurality of fibers.

In any of the foregoing embodiments, positioning the plurality of fibers on the formation surface of the tool further includes weaving the first group of the plurality of fibers together with the second group of the plurality of fibers prior to depositing the layer of material on the plurality of fibers.

Any of the foregoing embodiments may also include applying a metallic fiber interface coating to each of the plurality of fibers prior to positioning the plurality of fibers on the formation surface of the tool.

In any of the foregoing embodiments, each of the plurality of fibers includes at least one of alumina, boron, silicon carbide, silicon nitride, a glass, a ceramic material, or a metal.

Any of the foregoing embodiments may also include flipping the reinforced metallic structure so a second side of the plurality of fibers faces upward, and applying a second layer of material to the second side of the plurality of fibers.

Any of the foregoing embodiments may also include positioning a second plurality of fibers on the second layer of material and applying a third layer of material to the second plurality of fibers.

Also disclosed is a system for forming a reinforced metallic structure. The system includes a tool having a formation surface corresponding to a desired structure shape of the reinforced metallic structure. The system also includes a plurality of fibers configured to be positioned on the formation surface of the tool. The system also includes a cold-spray gun configured to output a gas including metallic particles towards the formation surface at a velocity sufficiently great to cause the metallic particles to bond together around the plurality of fibers to create the reinforced metallic structure.

Any of the foregoing embodiments may also include a restraint for securing at least two fibers of the plurality of fibers together such that the at least two fibers of the plurality of fibers resist separation in response to depositing the metallic particles on the plurality of fibers.

In any of the foregoing embodiments, the plurality of fibers includes a first group of fibers configured to be oriented in a first direction and a second group of fibers configured to be oriented in a second direction that is perpendicular to the first direction.

In any of the foregoing embodiments, the first group of fibers is configured to be woven together with the second group of fibers.

In any of the foregoing embodiments, at least one of the plurality of fibers includes a metallic fiber interface coating.

Also disclosed is a reinforced metallic structure formed by a method. The method includes positioning the plurality of fibers on the formation surface of the tool, the formation surface corresponding to a desired structure shape of the reinforced metallic structure. The method also includes depositing a layer of material on the plurality of fibers using a cold-spray technique. The method also includes removing the layer of material with the plurality of fibers from the tool to create the reinforced metallic structure.

In any of the foregoing embodiments, the method further comprises depositing a base layer of material on the formation surface of the tool using the cold-spray technique prior to positioning the plurality of fibers on the formation surface.

In any of the foregoing embodiments, positioning the plurality of fibers on the formation surface of the tool includes orienting each of a first group of the plurality of fibers in a direction parallel to each other prior to depositing the layer of material on the plurality of fibers.

In any of the foregoing embodiments, positioning the plurality of fibers on the formation surface of the tool further includes orienting each of a second group of the plurality of fibers parallel to each other and perpendicular to the first group of the plurality of fibers prior to depositing the layer of material on the plurality of fibers.

In any of the foregoing embodiments, the method further comprises flipping the reinforced metallic structure so a second side of the plurality of fibers faces upward, and applying a second layer of material to the second side of the plurality of fibers.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact. Cross hatching lines may be used throughout the figures to denote different parts but not necessarily to denote the same or different materials.

As used herein, "aft" refers to the direction associated with the exhaust (e.g., the back end) of a gas turbine engine. As used herein, "forward" refers to the direction associated with the intake (e.g., the front end) of a gas turbine engine.

As used herein, "radially outward" refers to the direction generally away from the axis of rotation of a turbine engine. As used herein, "radially inward" refers to the direction generally towards the axis of rotation of a turbine engine.

Figure 1:
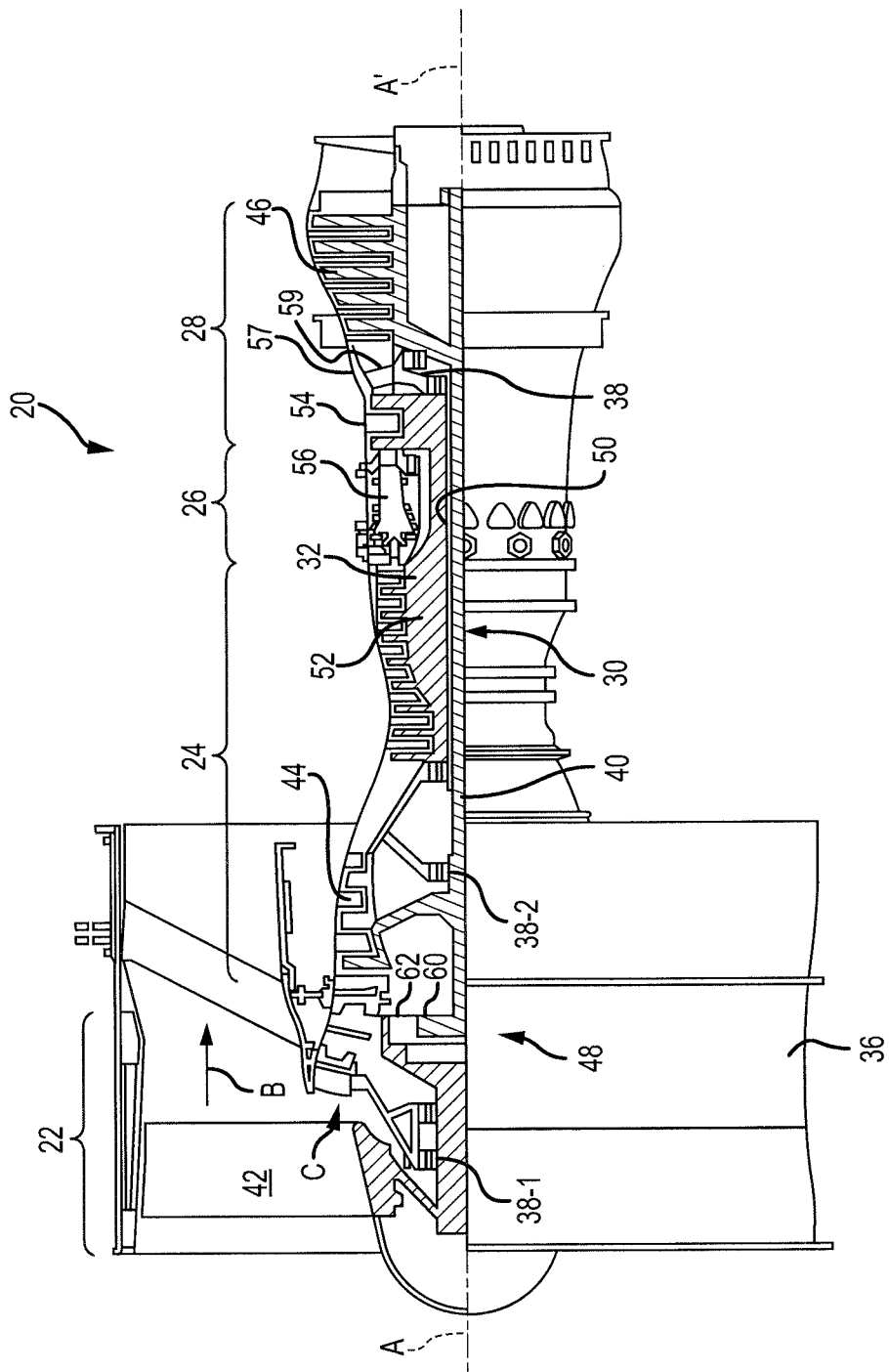
FIG. 1 is a schematic cross-section of a gas turbine engine, in accordance with various embodiments.

In various embodiments and with reference to FIG. 1, a gas turbine engine 20 is provided. The gas turbine engine 20 may be a two-spool turbofan that generally incorporates a fan section 22, a compressor section 24, a combustor section 26 and a turbine section 28. Alternative engines may include, for example, an augmentor section among other systems or features. In operation, the fan section 22 can drive coolant (e.g., air) along a bypass flow path B while the compressor section 24 can drive coolant along a core flow path C for compression and communication into the combustor section 26 then expansion through the turbine section 28. Although depicted as a two-spool turbofan gas turbine engine 20 herein, it should be understood that the concepts described herein are not limited to use with two-spool turbofans as the teachings may be applied to other types of turbine engines including turbojet, turboprop, turboshaft, or power generation turbines, with or without geared fan, geared compressor or three-spool architectures.

The gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 may generally comprise an inner shaft 40 that interconnects a fan 42, a low pressure compressor 44 and a low pressure turbine 46. The inner shaft 40 may be connected to the fan 42 through a geared architecture 48 that can drive the fan 42 at a lower speed than the low speed spool 30. The geared architecture 48 may comprise a gear assembly 60 enclosed within a gear housing 62. The gear assembly 60 couples the inner shaft 40 to a rotating fan structure. The high speed spool 32 may comprise an outer shaft 50 that interconnects a high pressure compressor 52 and high pressure turbine 54. A combustor 56 may be located between high pressure compressor 52 and high pressure turbine 54. A mid-turbine frame 57 of the engine static structure 36 may be located generally between the high pressure turbine 54 and the low pressure turbine 46. Mid-turbine frame 57 may support one or more bearing systems 38 in the turbine section 28. The inner shaft 40 and the outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The airflow of core flow path C may be compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion.

The gas turbine engine 20 may be, for example, a high-bypass ratio geared engine. In various embodiments, the bypass ratio of the gas turbine engine 20 may be greater than about six (6). In various embodiments, the bypass ratio of the gas turbine engine 20 may be greater than ten (10). In various embodiments, the geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). In various embodiments, the bypass ratio of the gas turbine engine 20 is greater than about ten (10:1). In various embodiments, the diameter of the fan 42 may be significantly larger than that of the low pressure compressor 44, and the low pressure turbine 46 may have a pressure ratio that is greater than about five (5:1). The low pressure turbine 46 pressure ratio may be measured prior to the inlet of the low pressure turbine 46 as related to the pressure at the outlet of the low pressure turbine 46 prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared engine, such as a geared turbofan, or non-geared engine, such as a turbofan, a turboshaft, or may comprise any gas turbine engine as desired.

In various embodiments, the low pressure compressor 44, the high pressure compressor 52, the low pressure turbine 46, and the high pressure turbine 54 may comprise one or more stages or sets of rotating blades and one or more stages or sets of stationary vanes axially interspersed with the associated blade stages but non-rotating about engine central longitudinal axis A-A'. The compressor and turbine sections 24, 28 may be referred to as rotor systems. Within the rotor systems of the gas turbine engine 20 are multiple rotor disks, which may include one or more cover plates or minidisks. Minidisks may be configured to receive balancing weights or inserts for balancing the rotor systems.

Various components of gas turbine engine 20 may include one or more sheet structures. A sheet structure may include a relatively flat structure having a fairly broad surface relative to its thickness. For example, a sheet structure may have a thickness between 10 thousandths of an inch (0.0.254 millimeters) and 0.5 inches (12.7 millimeters), or between 15 thousandths of an inch (0.0.381 millimeters) and 250 thousandths of an inch (6.35 millimeters).

Figure 2:
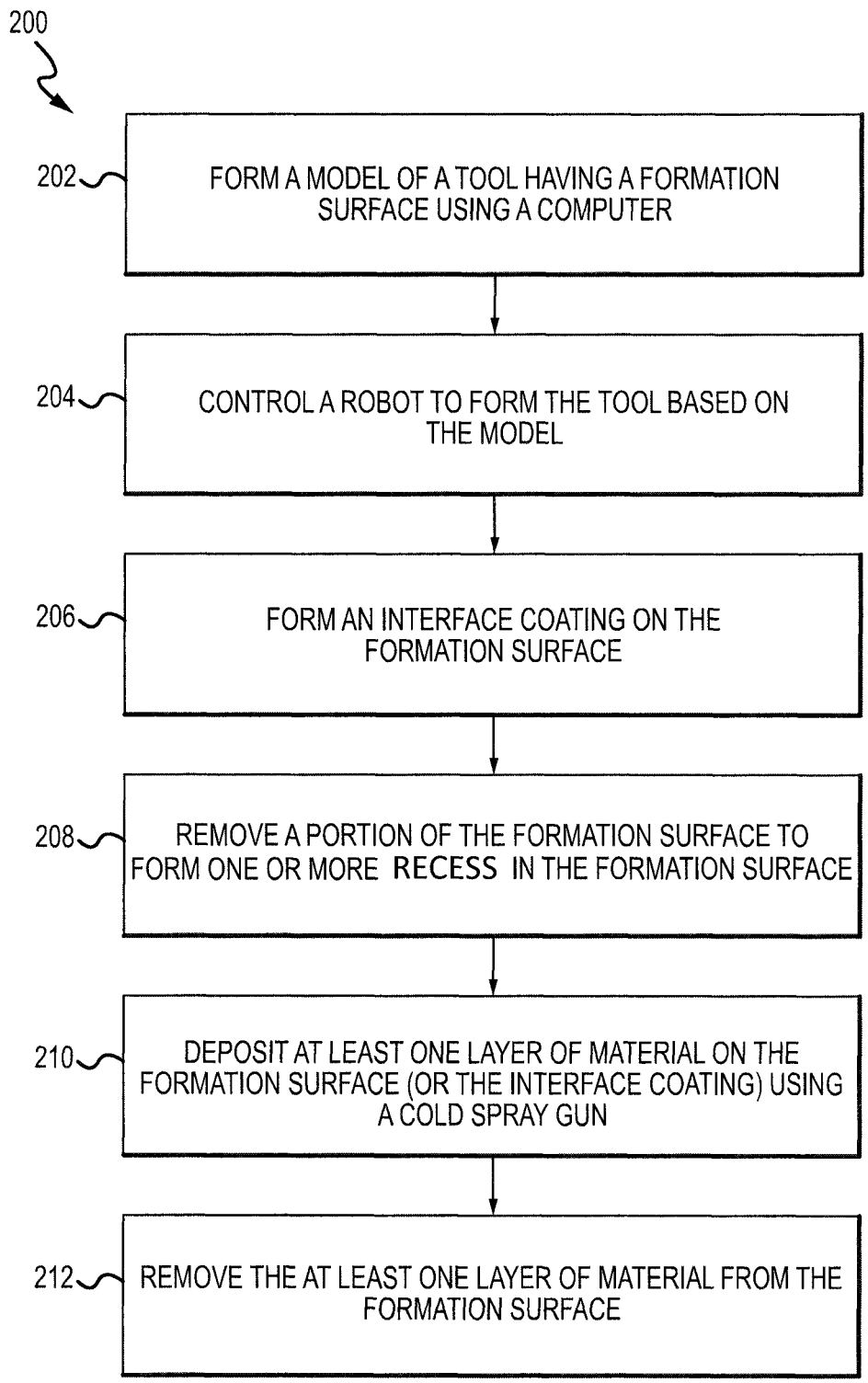
FIG. 2 is a flowchart illustrating a method for forming a sheet structure usable in the gas turbine engine of FIG. 1 using a cold-spray technique, in accordance with various embodiments.

Conventional processes for manufacturing such sheet structures are relatively expensive and time-consuming. Referring to FIG. 2, a method 200 for forming a sheet structure using a cold-spray process is shown. Formation of a sheet structure using the method 200 may be less expensive and less time-consuming than conventional processes. In various embodiments, the method 200 may be used to form sheet structures having a relatively large size. For example, the method 200 may be used to form sheet structures having a surface area of at least 1 inch squared (1 in.$^2$, 2.54 centimeters squared (cm$^2$)), 10 in.$^2$ (25.4 cm$^2$), 36 in.$^2$ (91.44 cm$^2$), or 100 in.$^2$ (254 cm$^2$).

In block 202, a computer is used to create a model of a tool. A computer may include a processor, a memory, and input device, and an output device. A computer may include one or more computers having processors and one or more tangible, non-transitory memories and be capable of implementing logic. The processor(s) can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. The memory may be any non-transitory memory capable of storing data. For example, the memory may store instructions to be executed by the processor, may store modeling software, may store a model of a component, or the like. The input device may include, for example, a mouse, a keyboard, a microphone, or the like. The output device may include, for example, a display, a speaker, an input/output port, or the like.

The tool may include a formation surface on which a material of the sheet structure is deposited. In that regard, the tool may be modeled such that the formation surface corresponds to a desired shape of the sheet structure. The tool may be modeled using any three-dimensional modeling software such as SolidWorks™, available from Dassault Systèmes of Vélizy-Villacoublay, France.

The tool may include any material having sufficient yield strength to resist the formation in response to receiving spray from a cold-spray gun. As will be described below, a cold-spray deposition technique delivers material at a relatively low temperature. Accordingly, the tool may include materials having a relatively low thermal resistance, which may result in lower cost of the tools. For example, the tool may include a metal, a plastic, or another compound material such as nylon, polymers, high-temperature resins, aluminum, low melt alloys, or the like. A low melt alloy may include any metallic alloy that has a melting temperature of 450 degrees Fahrenheit (450 degrees F., 233 degrees Celsius (C)) or below. For example, a low melt alloy may include one or more of bismuth, lead, tin, cadmium, indium, and the like. Selection of a material for the tool may be based considering the cost of the material of the tool and a durability of the tool.

In block 204, a robot is controlled to form the tool based on the computer-generated model. The tool may be formed using additive manufacturing, such as stereolithography. In that regard, the robot may be an additive manufacturing device, such as a 3-D printer, connected to the computer. The computer may be electrically coupled to the additive manufacturing device such that the device forms the tool based on the model. In various embodiments, the robot may include a machine separate from the additive manufacturing device and may independently control the additive manufacturing device based on the computer-generated model. In various embodiments, a user may receive the model from the computer and may manually provide information corresponding to the model to an additive manufacturing device.

In block 206, an interface coating may be applied to the formation surface of the tool. The interface coating may include, for example, a metal formed on the formation surface using electroplating. The interface material may include, for example, an epoxy or low melt alloy. In that regard, the interface coating may provide various benefits such as erosion protection of the tool, thermal protection of the tool, generation of a desired surface finish or feature, facilitation of separation of the sheet structure from the tool, and increased rigidity and resistance to deformation resulting from contact with relatively high-velocity spray from a cold-spray gun. In that regard, the formation surface of the tool may include one or both of the interface material or the material of the tool.

In various embodiments, it may be desirable to form one or more features, such as ribs, in the sheet structure that have great thickness relative to other portions of the sheet structure. In order to form the feature, a portion of the formation surface may be removed to form one or more recess in the formation surface in block 208. In response to the sheet structure material being cold-sprayed onto the formation surface, additional material may collect in the recess such that the corresponding part of the sheet structure has a greater thickness at the location corresponding to the recess. In various embodiments, the tool may be formed to have the recess such that removal of a portion of the formation surface is optional.

In block 210, at least one layer of material may be cold-sprayed onto the formation surface (or the interface coating) using a cold-spray deposition technique that utilizes a cold-spray gun. A cold-spray deposition technique is based on direct additive deposition of fine metallic particles that are accelerated to supersonic speeds using inert gas and a cold-spray gun. Inert gas may include at least one of an inert gas, air, or a less reactive gas, such as nitrogen. The cold-spray gun outputs a gas that includes the metallic particles and the inert gas. The output gas is directed towards the formation surface. The kinetic energy used in the process enables bonding of the metallic particles to each other on the formation surface of the tool, allowing the metallic particles to bind together to form the sheet structure. In various embodiments, the inert gas may be heated to a temperature that is between 400 degrees F. (204.4 degrees C.) and 1000 degrees F. (537.8 degrees C.). The temperature of the inert gas may, however, remain significantly below the melting point of the material of the metallic particles. In this context, significantly may refer to 5 percent (5%), or 15%, or 25%.

In various embodiments, it may be desirable for the sheet structure to have a greater relative thickness at particular locations. In that regard, the cold-spray gun may be used to apply more of the metallic particles to the particular locations to increase the thickness at the particular locations.

In various embodiments, the cold-spray gun may be controlled by at least one of a computer or a robot. In that regard, the computer or robot may be programmed to spray a predetermined amount of the metallic particles at each location of the sheet structure. The predetermined amount of the metallic particles sprayed at each location may result in each location of the sheet structure achieving the desired thickness.

Using a computer, and an electromechanical control system that is controlled by the computer, to control the cold-spray gun may result in a relatively accurate deposition of the metallic particles. The computer (or a user) may control such deposition factors as rate of discharge of the metallic particles, a distance from the tool from which the cold-spray gun is used, and the rate of movement of the cold-spray gun relative to the tool to adjust the thickness of the sheet structure.

A cold-spray gun outputs a relatively narrow plume of the output gas. This relatively narrow plume results in an ability to precisely position the metallic particles where desired.

The metallic particles used to form the sheet structure may include various metals and corresponding alloys such as, for example, titanium or titanium alloys, nickel or nickel alloys, aluminum or aluminum alloys, titanium aluminide alloys, cobalt or cobalt alloys, iron, or the like.

In block 212, the at least one layer of material (corresponding to the sheet structure) may be removed from the formation surface. This sheet structure may be removed in a variety of manners. In various embodiments, the sheet structure may be physically manipulated away from the formation surface by applying a force to the sheet structure in a direction away from the formation surface. In various embodiments, this physical manipulation may be performed by a user grasping a portion of the sheet structure, may be performed by a user using a tool, such as a crowbar, to separate the sheet structure from the tool, or the like. In various embodiments, the tool may be constructed such that introduction of pressurized fluid causes flexure of the tool (potentially including the formation surface), thus facilitating release of the sheet structure. In various embodiments, water or another fluid may be introduced between the formation surface and the sheet structure via capillary action or other means. In that regard, the fluid may be frozen (and thus expand), exerting a separating force/pressure to facilitate release of the sheet structure.

In various embodiments, a releasing agent may be applied between the sheet structure and the tool to facilitate release of the sheet structure from the formation surface. The release agent may include, for example, Boron Nitride (i.e., a hexagonal boron nitride) or another similar release agent. The release agent may be applied between the sheet structure and the formation surface or between the formation surface and the interface coating prior to cold-spray deposition of the metallic particles or after cold-spray deposition of the metallic particles. The properties of the release agent may result in a weaker bond between the sheet structure and the tool, allowing the sheet structure to be removed from the tool with relative ease. In various embodiments, the release agent may be used and the sheet structure may still be physically manipulated away from the formation surface.

In various embodiments, the combination of the tool and the sheet structure may be heated to such a temperature that the sheet structure does not deform yet the tool, or interface coating, deforms or de-bonds from the sheet structure, facilitating release of the sheet structure. In various embodiments, the interface coating may include an adhesive having a melting point above that of the temperature of the cold-spray gas and below that of the sheet structure. In that regard, the sheet structure and the interface coating may be heated to the melting point of the interface coating, facilitating release of the sheet structure. The interface coating may then be reapplied to the tool prior to a new sheet structure being formed on the tool.

In various embodiments, the sheet structure may be etched from the tool. For example, an acid such as a Bronsted-Lowry acid or another etching agent or chemically reactive material may be applied to the tool, thereby etching the tool away from the sheet structure.

In various embodiments, additional operations may be performed on the sheet structure to complete the part after separation from the tool. For example, the additional operations may include machining of interfaces, welding of the part to additional parts, forming an integral portion of the sheet structure using a cold-spray deposition technique with a different tool, or the like.

Figure 3:
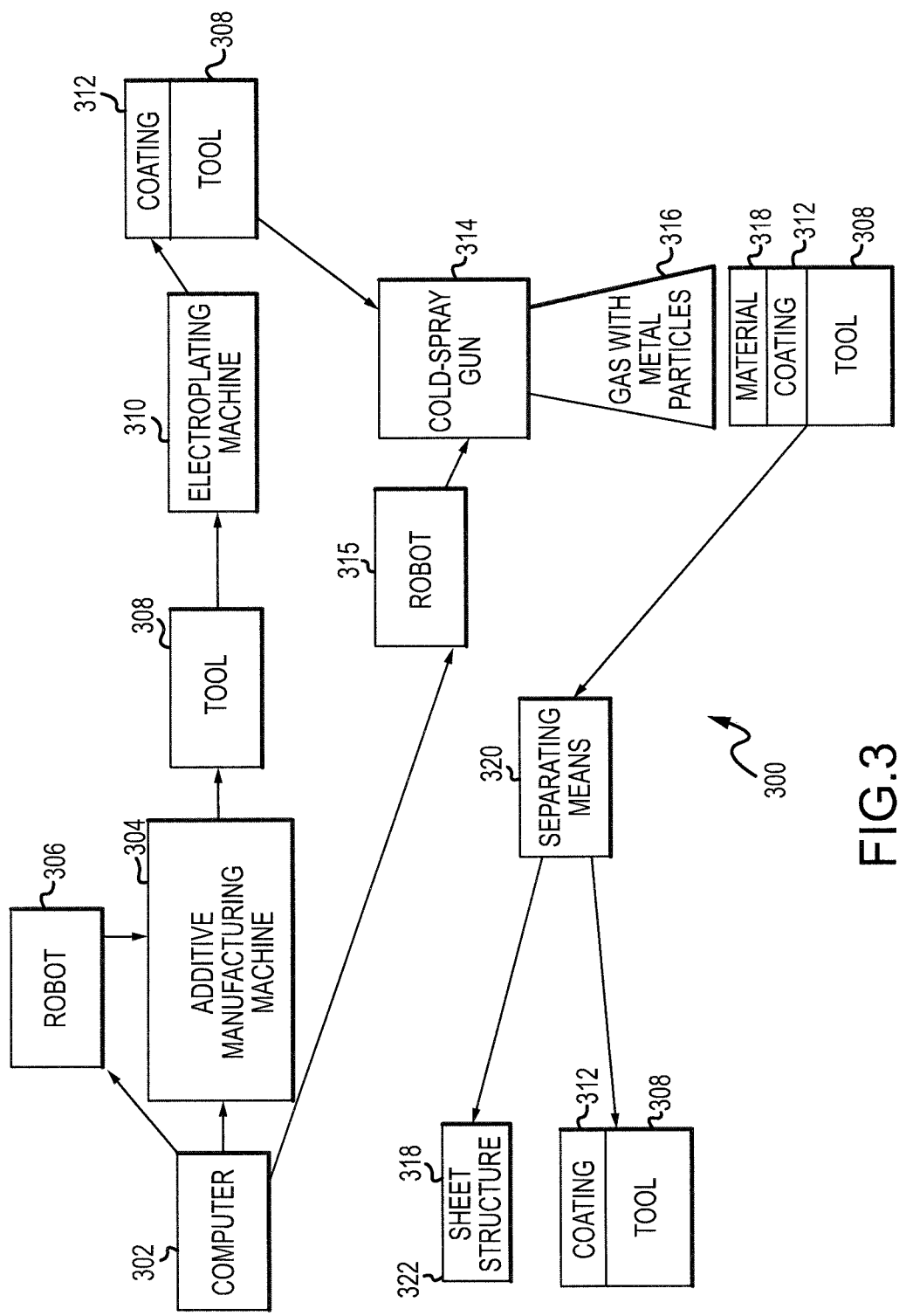
FIG. 3 is a block diagram illustrating a system for forming a sheet structure using a cold-spray technique, in accordance with various embodiments.

Turning now to FIG. 3, a system 300 for implementing the method 200 of FIG. 2 is shown. The system 300 includes a computer 302 in communication with an additive manufacturing machine 304 and a robot 306. In various embodiments, the robot 306 may not be present in the system 300. In various embodiments, the tool may be made using a machine different from the additive manufacturing machine 304.

A user may create a model of a tool using the computer 302. In various embodiments, the model may be received by the robot 306 and/or the additive manufacturing machine 304 which may, in turn, form a tool 308. In various embodiments, a user may provide the model to the robot 306 and/or the additive manufacturing machine 304. In various embodiments, a user may manually control the additive manufacturing machine 304 to create the tool 308.

The tool 308 may then be provided to an electroplating machine 310 or another device, which may apply an interface coating 312 on the tool 308. In various embodiments, the electroplating machine 310 may not be present in the system 300 such that no interface coating is applied. In various embodiments, the interface coating 312 may be applied via brushing, spraying, or another device. In various embodiments, the electroplating machine 310 may be controlled by the computer 302 or by another computer or robot to form the interface coating 312.

After the interface coating 312 is applied to the tool 308, the combined tool 308 and interface coating 312 may be subjected to spray from a cold-spray gun 314. The cold-spray gun 314 may direct a gas with metallic particles 316 towards the tool 308 and the interface coating 312. The gas with metallic particles 316 may hit the interface coating 312 and may begin to form one or more layer of material 318 on the interface coating 312. In various embodiments, the cold-spray gun 314 may be controlled by the computer 302 and/or by a robot 315. In various embodiments, the cold-spray gun 314 may be controlled by a separate computer or may be independently controlled.

After the material 318 has been applied to the interface coating 312, the combined tool 308, interface coating 312, and material 318 may be subjected to a separating means 320. The separating means 320 may include any method or structure used to separate the material 318 from the interface coating 312 as described above with reference to block 212 of FIG. 2. The separating means 320 may separate the material 318 from the interface coating 312. The resulting material 318 may correspond to a sheet structure 322.

Figure 4A:
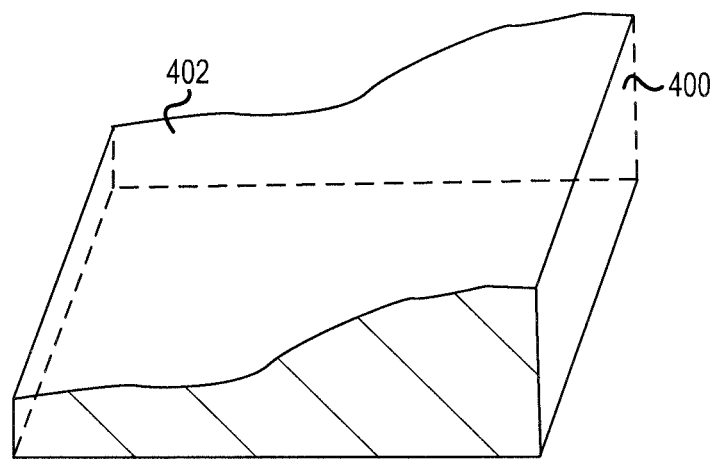
FIG. 4A is a drawing of a tool used for forming a sheet structure using a cold-spray technique, in accordance with various embodiments.
Figure 4B:
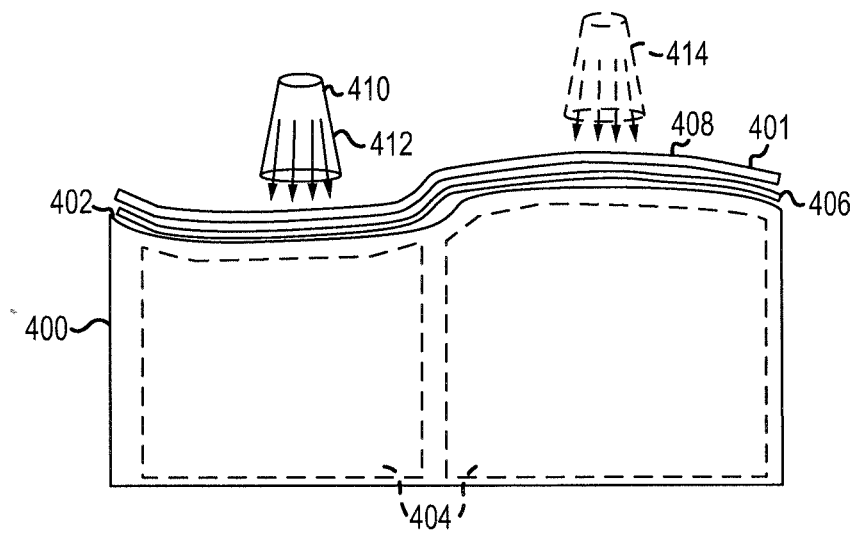
FIG. 4B is a drawing of the tool of FIG. 4A having an interface coating for receiving a cold-spray deposit, in accordance with various embodiments.

Referring now to FIGS. 4A and 4B, an exemplary tool 400 and sheet structure 401 is shown. The tool 400 has a formation surface 402. The formation surface 402 has a shape that corresponds to a desired shape of the sheet structure 401. The tool 400 includes one or more pockets 404 positioned within the tool 400 and having a material that is different from the remaining material of the tool 400. The pockets 404 may be designed to reduce the likelihood of deformation of the tool 400 due to impact with a relatively high velocity gas from a cold-spray gun 410. In that regard, the pockets 404 may include a material having a yield strength that is greater than that of the remaining portions of the tool 400. For example, the pockets 404 may include an epoxy or a low melt alloy.

An interface coating 406 may be applied to the formation surface 402 of the tool 400. The interface coating 406 may provide benefits as described above with reference to FIG. 2.

A cold-spray gun 410 may deposit metallic particles onto the interface coating 406 to form one or more layer of material 408. In order to deposit metallic particles onto the interface coating 406, the cold-spray gun 410 may move relative to the tool 400. For example, the cold-spray gun 410 may move from a first location 412 to a second location 414, depositing metallic particles at desired thicknesses along the way.

After the desirable amount of material 408 has been applied to the interface coating 406, the material 408 may be separated from the interface coating 406 in one or more manners as described above with reference to FIG. 2.

Figure 4C:
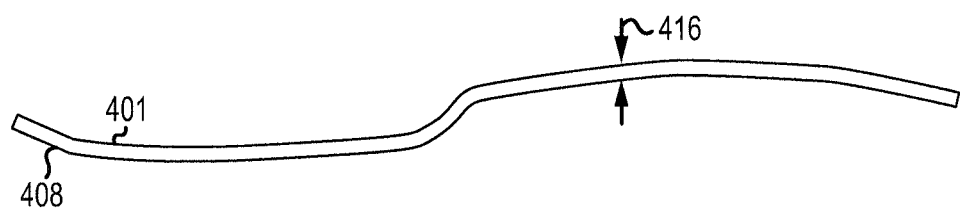
FIG. 4C is a drawing of a sheet structure using the tool and interface coating of FIG. 4B, in accordance with various embodiments.

Referring now to FIGS. 4A, 4B, and 4C, the material 408 that is separated from the interface coating 406 may be the sheet structure 401. As shown, the sheet structure 401 has a shape that corresponds to the shape of the formation surface 402. The sheet structure 401 may have a thickness 416 that corresponds to the amount of metallic particles deposited on the interface coating 406. The cold-spray gun 410 may achieve the desired thickness 416 in one or more of a variety of manners. For example, the desired thickness 416 may be achieved by making a predetermined number of passes over the formation surface 402 with the cold-spray gun 410, may be achieved by adjusting the rate of flow of gas exiting the cold-spray gun 410, may be achieved by adjusting the rate at which the cold-spray gun 410 moves relative to the formation surface 402, or the like.

Figure 5A:
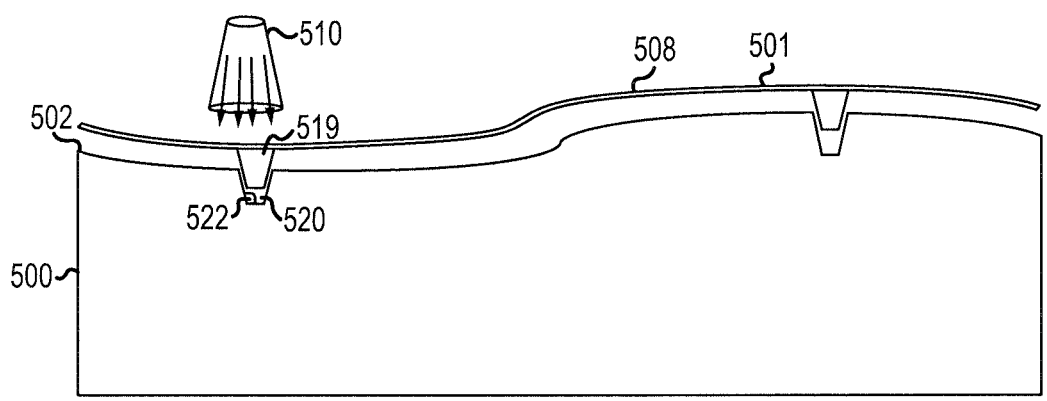
FIG. 5A is a drawing of a tool having a recess in a formation surface for forming a sheet structure with a feature having a greater thickness relative to other portions of the sheet structure, in accordance with various embodiments.
Figure 5B:
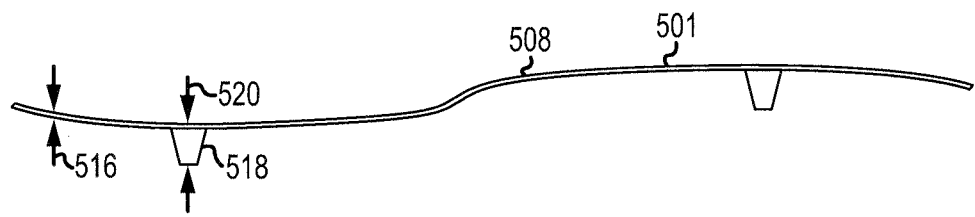
FIG. 5B is a drawing of the sheet structure with the feature formed using the tool of FIG. 5A, in accordance with various embodiments.

Turning now to FIGS. 5A and 5B, another tool 500 may include a formation surface 502 on which at least one layer of material 508 is directly deposited to form a sheet structure 501. Stated differently, the tool 500 may not include an interface coating. The formation surface 502 may have a shape that is similar to the formation surface 402 of FIG. 4A. However, it may be desirable for the sheet structure 501 to have one or more feature 518 such as a rib.

In order to form the feature 518, a portion 519 of the formation surface 502 may be removed from the tool 500 to form a recess 520. In various embodiments, a tool that includes an interface coating may be manipulated such that a portion of the interface coating and/or the formation surface 502 is removed from the tool to form the feature on the sheet structure. In various embodiments, the tool 500 may be formed with the recess 520 in place such that the tool 500 may be used without removal of any of the tool 500.

After the portion 519 of the formation surface 502 is removed, a cold-spray gun 510 may deposit metallic particles on the formation surface 502. In various embodiments, the cold-spray gun 510 may be manipulated across the formation surface 502 to deposit additional material within the recess 520. In various embodiments, the recess 520 may have particular features that facilitate bonding of the metallic particles within the recess 520. For example, the recess 520 may have an angle 522 that is greater than 90 degrees. The angle 522 may allow the metallic particles to bond together and entirely fill the recess 520.

In response to the sheet structure 501 being separated from the formation surface 502, the metal that was deposited in the recess 520 may form the feature 518 such as the rib. In various embodiments, the recess 520 may not be completely filled by the material. In that regard, the sheet structure 501 may have an indentation, or a volume, where the recess 520 is not completely filled.

Figure 6:
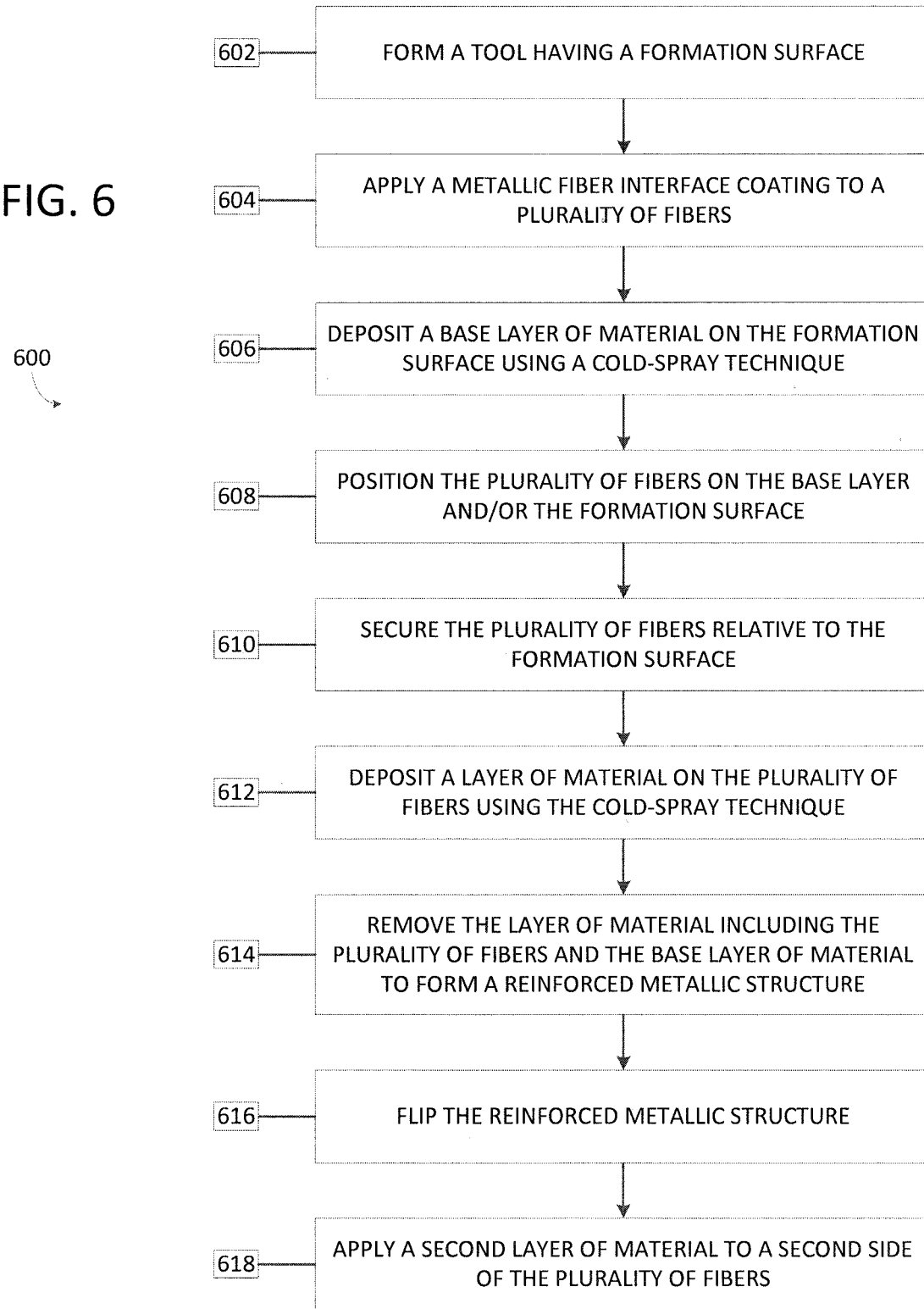
FIG. 6 is a flowchart illustrating a method for forming a reinforced metallic structure having reinforcing fibers using a cold-spray technique, in accordance with various embodiments.

Turning now to FIG. 6, a method 600 for forming a reinforced metallic structure is shown. In block 602, a tool having a formation surface may be formed. The tool may be formed in a similar manner as described above with reference to FIG. 2.

A plurality of fibers may be provided as reinforcement for the metallic structure. Each of the plurality of fibers may include one or more of alumina, boron, silicon carbide, silicon nitride, a glass, a ceramic material, a metal, or the like. In various embodiments, the plurality of fibers may be coated with a metallic interface coating in block 604. The metallic interface coating may include a coating of metal positioned circumferentially about one or more of the plurality of fibers. The metallic interface coating may include one or more of nickel, aluminum, titanium, or the like. In response to material being deposited onto the plurality of fibers, the metallic interface coating may increase adhesion with the deposited material, may protect the fibers from impact resulting from relatively high velocity deposition of the material, may facilitate relatively even spacing of each of the plurality of fibers relative to each other, or the like.

Forming such a structure with integrated reinforcing fibers using the cold-spray deposition technique provides advantages over currently existing processes such as diffusion bonding. For example, the metallic matrix and the reinforcing fibers may have different coefficients of thermal expansion. During conventional diffusion bonding, the materials may be heated to a temperature of 1,500 degrees F. (816 degrees C.) or higher, creating internal strain due to the various coefficients of thermal expansion. Using the cold-spray deposition technique, however, the temperatures experienced by the materials are significantly lower than 1,500 degrees F. (816 degrees C.), resulting in less strain, which reduces the likelihood of fiber damage, fiber distortion, or residual stress.

In various embodiments and in block 606, a base layer of material may be deposited on the formation surface of the tool using a cold-spray technique. The base layer of material may include at least a portion of material positioned on the formation surface.

In block 608, the plurality of fibers (with or without a metallic interface coating) may be positioned on the formation surface (or the base layer, if applied). In various embodiments, the plurality of fibers may be oriented in a desired position. For example, at least some of the plurality of fibers may be oriented in a direction parallel to each other. As another example, a first group of the plurality of fibers may be oriented in a direction parallel to each other, and a second group of the plurality of fibers may be oriented in a direction parallel to each other and perpendicular to the first group of the plurality of fibers.

In block 610, the plurality of fibers may be secured relative to the formation surface of the tool. In various embodiments, each of the plurality of fibers may span a length of the formation surface. The fibers may be secured relative to the formation surface in various manners. For example, one or more ends of the fibers may be clamped, may be wound about a drum, wound about a part, or the like. In various embodiments, the formation surface (or the base layer of material) may be formed to have grooves in which one or more of the plurality of fibers is positioned.

In block 612, a layer of material may be deposited on the plurality of fibers using the cold-spray technique. The layer of material may be deposited on a first surface of the plurality of fibers. In various embodiments, the particles of the material may bind together about the plurality of fibers, thus embedding the plurality of fibers within the layer of material.

In block 614, the layer of material (including the embedded fibers) may be removed from the tool, thus forming a reinforced metallic structure. The layer of material may be removed from the tool in a similar manner as described above with reference to FIG. 2.

In block 616, the reinforced metallic structure may be flipped such that a second surface, or side, of the fibers is facing towards the cold-spray gun. In various embodiments, this may include repositioning of the cold-spray gun instead of, or in addition to, physically rotating the reinforced metallic structure.

In block 618, a second layer of material may be applied to the second surface, or side, of the plurality of fibers. The second layer of material may bind together with the first layer of material and further embed the fibers within the material.

In various embodiments, the blocks of the method 600 may be repeated to form a multilayer structure with fibers between two or more layers. For example, after block 618, a second plurality of fibers may be placed upon the second layer of material. A third layer of material may be deposited upon the second plurality of fibers, forming a 3 layered structure with a plurality of fibers between each layer. At that point, a third plurality of fibers may be placed upon the third layer of material and a fourth layer of material may be deposited on the third plurality of fibers. In this manner, a structure may be formed having any number of layers with fibers between each layer.

In various embodiments, multiple two-layer structures may be formed, each having a plurality of fibers between each layer. Each of the two-layer structures may then be bonded together, via heat or another bonding method, to form a multilayer structure with fibers between various layers. In various embodiments, a layer of fibers may be positioned between each two-layer structure such that a plurality of fibers is present between each layer of the multilayer structure.

Figures 7A, 7B, 7C:
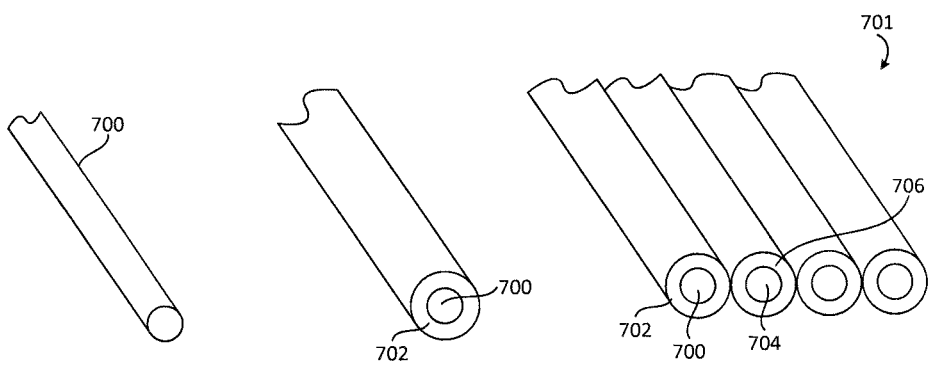
FIGS. 7A, 7B, and 7C are drawings illustrating various features of a plurality of fibers usable for forming a reinforced metallic structure, in accordance with various embodiments.

Referring now to FIGS. 7A, 7B, and 7C, features of a plurality of fibers 701 are shown. The plurality of fibers 701 may include a first fiber 700, a second fiber 704, and one or more additional fibers. The first fiber 700 may include a metallic fiber interface coating 702 applied about a circumference of the fiber 700. Likewise, the fiber 704 may include a metallic fiber interface coating 706 applied about a circumference of the fiber 704. The metallic interface coating may include the same metal as will be deposited on the plurality of fibers 701 or may include a different metal. For example, the metal may include aluminum, an aluminum alloy, nickel, a nickel alloy, or the like.

Figure 8A:
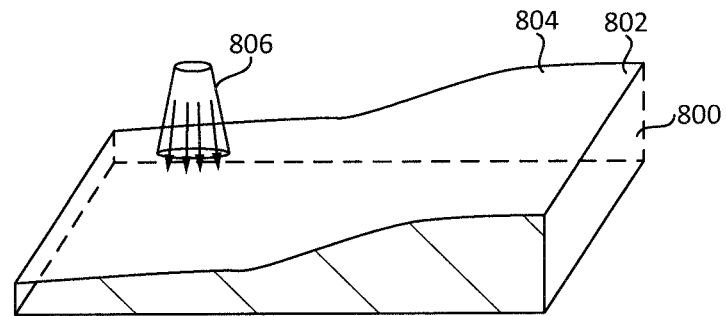
FIGS. 8A, 8B, and 8C are drawings illustrating various steps for forming a reinforced metallic structure having reinforcing fibers using a cold-spray technique, in accordance with various embodiments.

Turning to FIG. 8A, a tool 800 for forming a reinforced metallic structure is shown. The tool 800 includes a formation surface 802. A cold-spray gun 806 may be used to deposit a base layer of material 804 on the formation surface 802 of the tool 800.

Figure 8B:
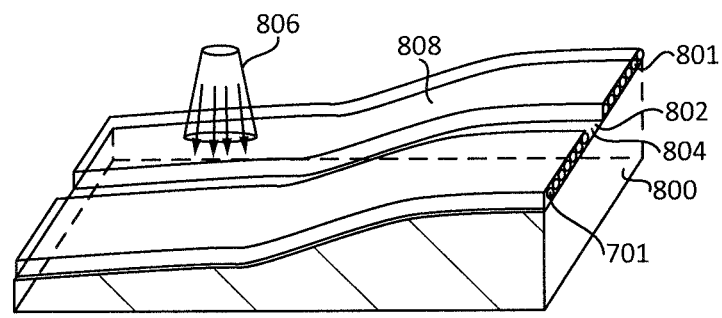

Turning to FIG. 8B, the plurality of fibers 701 may be positioned on the base layer of material 804. A second plurality of fibers 801 may also be positioned on the base layer of material 804. As shown, each of plurality of fibers 701 and each of the second plurality of fibers 801 may be oriented in a direction parallel to each other and may span a length of the formation surface 802. Likewise, the plurality of fibers 701 and the second plurality of fibers 801 may be positioned such that they remain flush with the formation surface 802 (and/or the base layer of material 804) over contours of the formation surface 802 and/or the base layer of material 804.

Figure 8C:
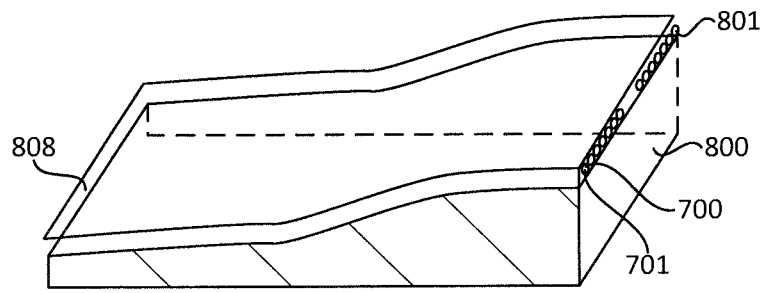

After the plurality of fibers 701 and the second plurality of fibers 801 are positioned relative to the formation surface 802, the cold-spray gun 806 may deposit a layer of material 808 on the plurality of fibers 701 and the second plurality of fibers 801. The deposited material may bond together around each of the plurality of fibers 701 and each of the second plurality of fibers 801, thus embedding the plurality of fibers 701 and the second plurality of fibers 801 within the layer of material 808 as shown in FIG. 8C.

Figure 9A:
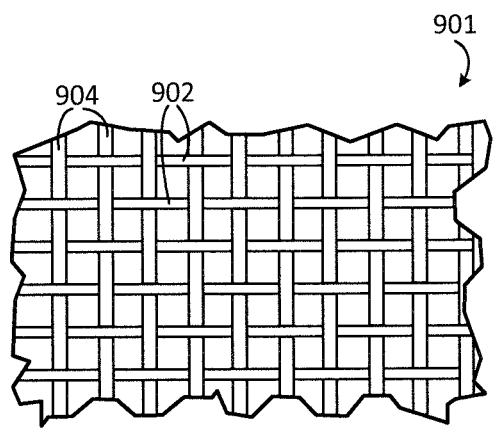
FIGS. 9A, 9B, 9C, and 9D are drawings illustrating various steps for forming a reinforced metallic structure having a mesh of fibers using a cold-spray technique, in accordance with various embodiments.

Turning to FIG. 9A, a plurality of fibers 901 may include a first group of fibers 902 each positioned in a direction parallel to each other. The plurality of fibers 901 may also include a second group of fibers 904 each positioned parallel to each other and perpendicular to each of the first group of fibers 902. In various embodiments, the plurality of fibers 901 may be woven together, as shown in FIG. 9A. In various embodiments, the plurality of fibers 901 may not be woven together, may be knitted together, or otherwise configured.

Figure 9B:
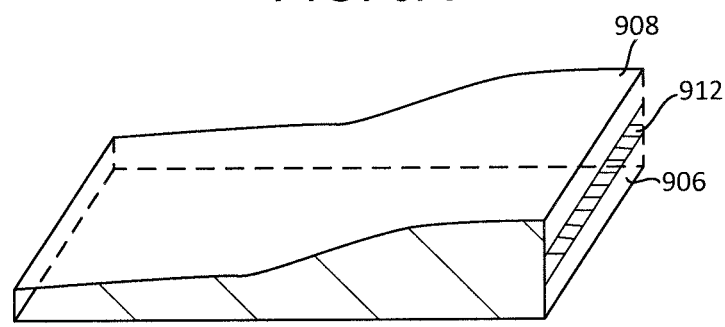

Referring to FIG. 9B, a tool 906 having a formation surface 908 may be used for forming a reinforced metallic structure. The tool 906 may include a restraint 912, such as a clamp or drum, configured to retain the plurality of fibers 901 in place relative to the formation surface 908.

Figure 9C:
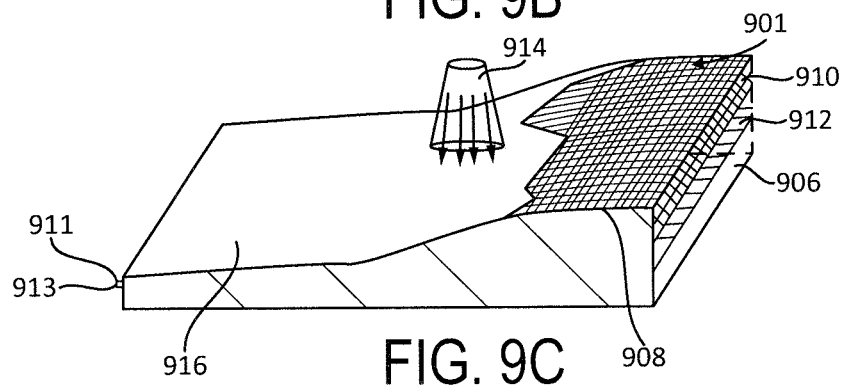
Figure 9D:
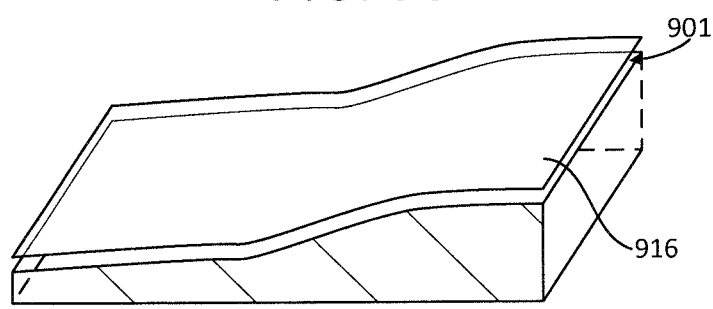

Referring to FIG. 9C, the plurality of fibers 901 may be positioned on the formation surface 908 of the tool 906. A first end 910 of the plurality of fibers 901 may be retained in place via the restraint 912. In various embodiments, another restraint 913 similar to the restraint 912 (i.e., a clamp or drum) may be positioned on another end of the tool 906 for retaining a second end 911 of the plurality of fibers 901. After the plurality of fibers 901 are retained in place via the restraint 912 and the restraint 913, a cold-spray gun 914 may deposit a layer of material 916 on the plurality of fibers 901. The particles of the material may bond together about each of the plurality of fibers 901 such that the plurality of fibers 901 are embedded within the layer of material 916, as shown in FIG. 9D. After deposition of the layer of material 916, the plurality of fibers 901 may be released from the restraint 912 and the restraint 913.

Figure 10A:
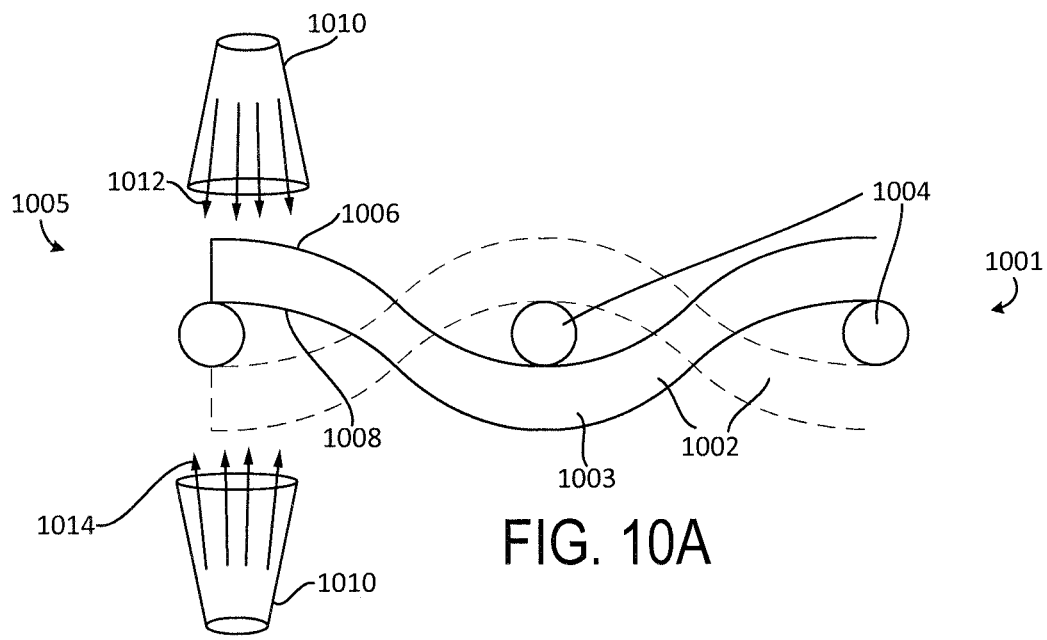
FIGS. 10A and 10B are drawings illustrating various steps for forming a reinforced metallic structure having a plurality of fibers using a cold-spray technique on two sides of the plurality of fibers, in accordance with various embodiments.

Referring now to FIG. 10A, another plurality of fibers 1001 may include a first group of fibers 1002 each oriented in a first direction and a second group of fibers 1004 each oriented in a direction perpendicular to the first group of fibers 1002. The first group of fibers 1002 may include a fiber 1003 having a first side 1006 and a second side 1008. In order to form a reinforced metallic structure 1005, a cold-spray gun 1010 may deposit a first layer of material 1012 on the first side 1006 of the plurality of fibers 1001. After the first layer of material 1012 has been deposited, the reinforced metallic structure 1005 may be flipped or rotated such that the second side 1008 is exposed. In various embodiments, the second side 1008 may be manipulated to face upward (i.e., towards the cold-spray gun 1010) so that a second layer of material 1014 may be deposited downward from the cold-spray gun 1010. After this flip, the cold-spray gun 1010 may deposit the second layer of material 1014 on the second side 1008 of the plurality of fibers 1001. Application of the first layer of material 1012 and the second layer of material 1014 may increase the likelihood of particles of the material being positioned in most or all areas within the mesh of the plurality of fibers 1001.

Figure 10B:
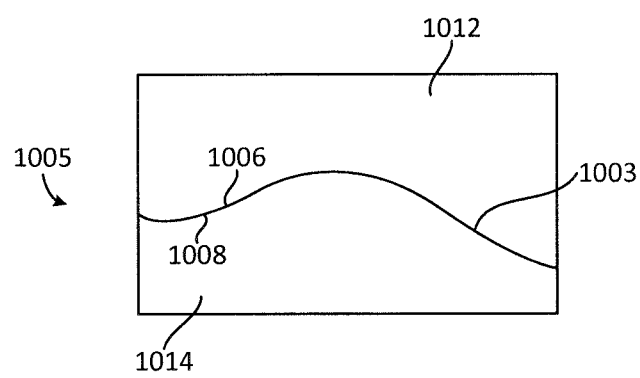

Referring now to FIG. 10B, a cross-sectional view of the reinforced metallic structure 1005 is shown. As shown, the fiber 1003 is surrounded by the first layer of material 1012 on the first side 1006 and the second layer of material 1014 on the second side 1008.

In various embodiments, the reinforced metallic structure 1005 may be subjected to additional processing after being formed as described above. For example, the reinforced metallic structure 1005 may be subjected to hot isostatic press (HIP) for reducing the porosity (i.e., increasing the density) of the reinforced metallic structure 1005.

While the disclosure is described with reference to exemplary embodiments, it will be understood by those skilled in the art that various changes may be made and equivalents may be substituted without departing from the spirit and scope of the disclosure. In addition, different modifications may be made to adapt the teachings of the disclosure to particular situations or materials, without departing from the essential scope thereof. The disclosure is thus not limited to the particular examples disclosed herein, but includes all embodiments falling within the scope of the appended claims.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of a, b, or c" is used in the claims, it is intended that the phrase be interpreted to mean that a alone may be present in an embodiment, b alone may be present in an embodiment, c alone may be present in an embodiment, or that any combination of the elements a, b and c may be present in a single embodiment; for example, a and b, a and c, b and c, or a and b and c. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "device for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method for forming a reinforced metallic structure, comprising:
    applying a metallic fiber interface coating circumferentially around each of a plurality of fibers, the metallic fiber interface coating including a metal;
    positioning the plurality of fibers on a formation surface of a tool after applying the metallic fiber interface coating, the formation surface corresponding to a desired structure shape of the reinforced metallic structure;
    depositing a layer of metal material on the plurality of fibers using a cold-spray technique after the positioning the plurality of fibers on the formation surface; and
    removing the layer of metal material with the plurality of fibers from the tool to create the reinforced metallic structure.

2. The method of claim 1, further comprising depositing a base layer of material on the formation surface of the tool using the cold-spray technique prior to positioning the plurality of fibers on the formation surface.

3. The method of claim 1, wherein the plurality of fibers on the formation surface of the tool include a first group of the plurality of fibers oriented in a direction parallel to each other.

4. The method of claim 3, wherein at least two fibers of the plurality of fibers are secured together prior to depositing the layer of material on the plurality of fibers such that the at least two fibers of the plurality of fibers resist separation in response to depositing the layer of material on the plurality of fibers.

5. The method of claim 3, wherein the plurality of fibers on the formation surface of the tool further includes a second group of the plurality of fibers oriented parallel to each other and perpendicular to the first group of the plurality of fibers.

6. The method of claim 5, wherein the first group of the plurality of fibers are woven together with the second group of the plurality of fibers.

7. The method of claim 1, wherein each of the plurality of fibers includes at least one of alumina, boron, silicon carbide, silicon nitride, a glass, a ceramic material, or a metal.

8. The method of claim 1, further comprising flipping the reinforced metallic structure so a second side of the plurality of fibers faces a cold-spray applicator, and applying a second layer of material to the second side of the plurality of fibers.

9. The method of claim 8, further comprising positioning a second plurality of fibers on the second layer of material and applying a third layer of material to the second plurality of fibers.

10. The method of claim 1, wherein positioning the plurality of fibers on the formation surface of the tool includes orienting the plurality of fibers in a desired orientation.

* * * * *